March 6, 1928.
H. S. GRAVES
1,661,366
PROCESS OF MAKING PISTON RINGS
Filed Oct. 15, 1924
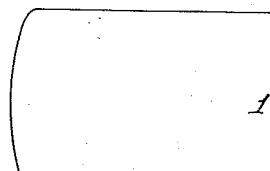
Fig.1.
Fig.2.
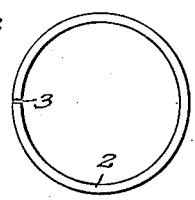
Fig.3.
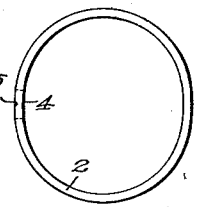
Fig.4.
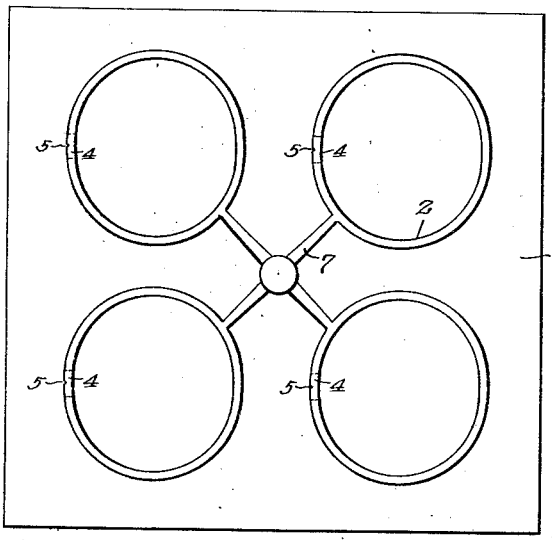
Fig.5.
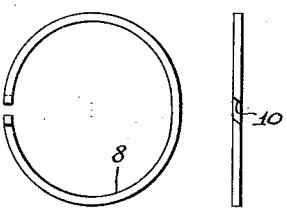
Fig.7. Fig.8.
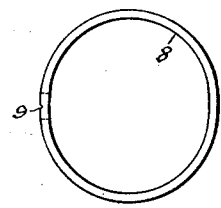
Fig.6.
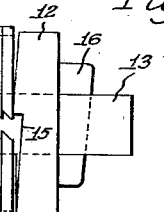
Fig.9.
Fig.11.
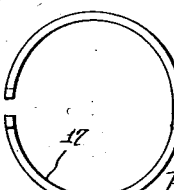
Fig.12.
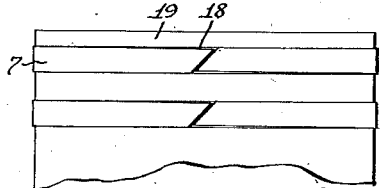
Fig.10. Fig.13.
Inventor
Harry S. Graves,
By
Attorneys Patented Mar. 6, 1928.

1,661,366

UNITED STATES PATENT OFFICE.

HARRY S. GRAVES, OF DETROIT, MICHIGAN, ASSIGNOR TO SPIRAL PISTON RING COMPANY, OF DETROIT, MICHIGAN, A CORPORATION OF MICHIGAN.

PROCESS OF MAKING PISTON RINGS.

Application filed October 15, 1924. Serial No. 743,688.

This invention relates to piston rings and has special reference to a process of making helical split rings that are adapted to be mounted in the grooves of a piston to frictionally engage walls of the piston grooves and insure a tight connection so that when the rings engage the walls of the cylinder there will be substantially a sealed connection between the piston and cylinder walls. Such type of ring is disclosed in Patent No. 1,477,368, dated Dec. 11, 1923, and I find that this type of helical ring can be more expeditiously and economically produced by the following process.

Briefly described, I cast split rings and assemble the rings for pressure whereby flat split rings are converted into helical rings. With the rings under pressure they are subjected to a heat treatment and tempering which sets the rings so that their inherent tendency will be to remain helical, without any danger of heat, under ring working conditions, distorting the rings or causing the same to assume embryo shape.

My process will be hereinafter specifically described and then claimed, and reference will now be had to the drawing, wherein Fig. 1 is a perspective view of a tube from which ring sections are removed;

Fig. 2 is a perspective view of one of the ring sections;

Fig. 3 is a perspective view of the ring cut to provide a split ring;

Fig. 4 is a plan of the ring provided with an insert and constituting a pattern;

Fig. 5 is a plan of a pattern board provided with a plurality of patterns adapted to be used with mold parts for producing cast rings;

Fig. 6 is a plan of a cast ring;

Fig. 7 is a similar view of the ring cut to provide separate ends or a split;

Fig. 8 is an edge view of the same;

Fig. 9 is a plan of a plurality of flat split rings assembled preparatory to being subjected to pressure;

Fig. 10 is a similar view showing the rings under pressure and prior to or after having been subjected to heat treatment;

Fig. 11 is an edge view of one of the finished rings;

Fig. 12 is a plan of the same; and

Fig. 13 is an elevation of a portion of a piston body having grooves provided with rings produced by my process.

To put my invention into practice, I select a metallic tube 1 approximating the diameter of the finished product and from this tube are cut ring sections, one of which is designated 2 in Fig. 2.

The ring section is sawed or cut, as at 3, and an insert 4 placed between the ends of the ring. The insert 4 has a notch or demarcation 5 and this form of ring is used as a pattern for producing similar cast rings. The purpose of the insert 4 is to expand the severed ring to a desired out of round shape, so that a cast ring may be made from such an out of round pattern, and the cast ring contracted on a piston to enter a cylinder and afford a desired cylinder wall pressure.

For instance, a pattern board 6 may be provided with a plurality of pattern rings 2 connected by a sprue and gate patterns 7. This pattern board is used in the usual manner in connection with a mold for the gang production of cast rings, one of which is designated 8 in Fig. 6. The cast ring is formed with a notch 9, which indicates a place where the ring is to be sawed or otherwise severed, and this has been accomplished in Figs. 7 and 8 where the severed ring has beveled ends 10 representing a conventional form of split for the ring.

After a plurality of these cast rings are produced they are assembled in a pressure device, one form of which has been shown in Figs. 9 and 10. The device includes heads 11 and 12 with the head 12 slidable on a stem 13 carried by the head 11. On the inner face of the head 11 is a centering guide 14 and between said heads are arranged the split rings 8. After the rings have been assembled, a suitable instrumentality may be placed between the split ends of the rings to properly aline all of the rings with reference to helical inner faces 15 of the heads 11 and 12. The rings are now in condition to be subjected to pressure and as illustrating a simple means of doing so the stem 13 has a wedge or key 16 which may be driven inwardly to force the head 12 towards the head 11. As a result of such pressure all of the rings assume helical contour.

With the rings held under pressure they receive a heat treatment and are tempered, the heat treatment being much higher in degree than what the rings would encounter under piston working conditions, consequently the rings when removed from between the heads 11 and 12 will retain their helical contour.

Finished rings are shown in Figs. 11 to 13 inclusive and designated 17. These rings when placed in grooves 18 of a piston body 19 bear against opposed walls of the grooves and the expansive force of each ring will cause it to bear against the walls of a cylinder in which the piston is placed.

Reverting to the casting operation it will be noted that the insertion in the pattern ring 2 causes the production of the cast ring 8 other than circular, and by splitting the cast ring there is clearance for contraction of the ring incident to placing it in a cylinder by the aid of the piston 19. When placing the piston in the cylinder the ring is contracted to circular form or that form defined by a cross section of the cylinder, and the inherent tendency of the ring to expand causes the outer wall of the ring to snugly engage the cylinder wall.

When placing the piston ring in the groove 18 of the piston it is sprung, towards a flat condition and when released in the groove 18 is bound to frictionally engage opposed walls of the groove. This means that the greater part of the piston ring is sealed relative to a cylinder wall and groove walls of a piston, and it has been found that such rings sustain a higher degree of compression than rings which ordinarily engage a cylinder wall without exerting any pressure against grooved walls.

At different stages during the production of piston rings in accordance with my process the rings may be subjected to grinding operations, particularly on the sides of the ring so that in the finished product the ground sides will snugly fit against the groove walls. Furthermore, in the casting operation it will be noted that molten metal flowing is a circumferential direction causes the cast ring to have its grain circumferentially of the ring and that after the heat treating and setting steps of the process the rings will have an unbroken skin or surface which increases the longevity of the rings in connection with a piston.

Since pressure is employed to offset the ends of flat split rings to convert them into helical rings, it is obvious that various forms of presses or power devices, equipped with shapers or formers approaching the configuration of the heads 11 and 12 may be used, and on account of there being various ways of heat treating and tempering metal to set its form, I do not care to confine my invention to any specific mode of applying heat.

From the foregoing it will be observed that I have devised a process of making a helical piston ring which when placed in use will be expansible in three directions and capable of retaining such expansible proclivities under high heat conditions. Circumferential distension of the ring is brought about by making it "out of round", so that when the ring is retracted it will at all times tend to distend. Longitudinal distension is brought about by offsetting the split ends of the ring and fixing the ring so that the ends are constantly resilient. A ring possessing such resiliency is far superior for piston purposes than a ring which is distended in a radial direction.

I also desire to direct attention to the fact that my process may involve heat-treating of a single ring or a plurality of rings before subjecting the same to pressure, then again, one or more rings may be simultaneously heated and subjected to pressure.

It is obvious that cast rings can be produced on a large scale and many converted into helical rings, therefore I do not care to confine my process to any specific apparatus for carrying out the various steps involved.

What I claim is:—

1. A process of making helical piston rings from flat split rings, consisting in assembling a plurality of flat split rings side by side with the split ends of said rings in proximity to one another, subjecting the assembled rings to sidewise pressure to convert each flat ring into a helix, and then heat-treating said helical rings while under pressure to set the helical contour of said rings.

2. A process of making helical piston rings from flat split rings having opposed spaced ends, consisting in assembling a plurality of flat split rings side by side about an arbor, alining the split ends of said rings, subjecting said rings to lateral pressure on said arbor to cause all of said rings to have a helical contour imparted thereto, and then setting said rings for a constant helical contour.

3. A process of making a helical piston ring consisting in casting an oval ring, removing a piece from the ring so that its ends may be moved towards each other and the ring contracted, bringing pressure to bear on the sides of the ring to offset its ends, and then subjecting the ring while under pressure to an operation which sets its offset ends to withstand the maximum heat incident to piston operation.

4. A process of making piston rings which have an inherent tendency to distend in three directions, which process consists in casting piston rings out of round, removing pieces from the rings whereby they may be contracted and when so held tend to expand, assembling the rings side by side, offsetting the ends of the assembled rings by pressure so that the offset ends of all rings will be similar, and then fixing the rings while still under pressure so that each ring will have the configuration of a helix and will resist pressure in a longitudinal direction.

5. A process of making helical piston rings consisting of casting a plurality of out of round rings at one operation, removing pieces from the rings to provide separated ring ends so that the rings may be contracted, assembling such split rings side by side with the split ends of said rings in two spaced-apart rows for endwise pressure to simultaneously offset the ends of said rings, and then heat-treating while under pressure to set the offset condition of the ring ends whereby the ends of each ring will be resilient relative to each other.

In testimony whereof I affix my signature.

HARRY S. GRAVES.